United States Patent Office 3,586,490
Patented June 22, 1971

3,586,490
GELLED HYDROCARBON COMPOSITIONS
Gerhart Karg, Pompton Lakes, N.J., assignor to Witco
 Chemical Company, Inc., New York, N.Y.
No Drawing. Filed Mar. 21, 1968, Ser. No. 714,800
 Int. Cl. C10l 7/00
U.S. Cl. 44—7                                13 Claims

ABSTRACT OF THE DISCLOSURE

Liquid aliphatic hydrocarbons are converted into stable gels by the addition of a liquid gelling agent composed of small proportions of water, an aliphatic polyhydric alcohol and an alkanolamine salt of a phosphoric acid ester of ethoxylated linear or branched chain aliphatic alcohols.

---

This invention relates to novel gelled hydrocarbon compositions, and more particularly to gelled hydrocarbon compositions containing a novel liquid gelling agent capable of forming gel compositions rapidly by simple admixture of hydrocarbon and gelling agent.

Gelled hydrocarbon compositions have been found desirable for numerous applications such as in adhesive mixtures, solid propellant fuels, incendiaries, barbecue flame starters, hydraulic fracturing media and the like. Materials which rapidly gel hydrocarbons find an important utility in lessening the danger of fire or explosion in storage locations containing large quantities of inflammable petroleum products.

Various materials have been suggested for preparing gels of liquid hydrocarbons and other organic solvents and are disclosed, for example, in U.S. Pats. 2,789,040; 2,870,095; 3,012,966; 3,097,168 and 3,334,053. Generally it has been found that relatively cumbersome procedures are required for preparing the gelling agent, such as coprecipitation, and extensive mixing during gel preparation usually is required when solid gelling agents are utilized. Use of an all liquid gelling agent offers distinct advantages especially in regard to handling, transportation and availability of methods for combining with the hydrocarbon gel base. Furthermore, the cost of the materials as used in the compositions of the present invention offers a distinct economic advantage.

In accordance with this invention it has been discovered that stable gels may be prepared by combining normally liquid hydrocarbons with at least about 5%, by weight of the composition, of a gelling agent consisting essentially of, in the ranges of proportions set forth hereafter, (1) water, (2) an aliphatic polyhydric alcohol having 2 to 10 carbon atoms, and (3) a phosphoric acid ester of a member selected from the group consisting of ethylene and/or propylene oxide adducts of $C_8$ to $C_{18}$ linear aliphatic alcohols or $C_{10}$ to $C_{20}$ branched chain aliphatic alcohols, said alcohols containing 2 to 20 mols of ethylene oxide and/or propylene oxide per mol, said phosphoric acid ester being present as the lower molecular weight alkanolamine salt.

The liquid hydrocarbons suitable for use in preparing the compositions of the present invention in general may be characterized as those boiling within the range of 40° C. to 400° C. and primarily aliphatic in nature, i.e., composed mainly of paraffinic and cycloparaffinic compounds. Surprisingly, it has been found that even lower boiling hydrocarbons such as petroleum ether may be utilized to produce quite stable gels. Petroleum ether, or ligroin, is composed of hydrocarbons from butane to octane, mainly pentane and hexane, and boils over a range of about 35°–80° C. The gels resulting are somewhat thinner than those prepared using a higher boiling mineral oil. Other suitable hydrocarbons include various naphthas, kerosene, jet fuel, aliphatic petroleum solvents and mineral oils, including white mineral oils. The white oils generally distill at a range of 330° C.–390° C. While the invention is especially applicable for gelling liquid hydrocarbons, it is also of use in gelling water immiscible aliphatic organic liquids such as halogenated hydrocarbons exemplified by perchloroethylene, 1,1,1-trichloroethane, trichlorofluoromethane, dichlorofluoromethane and 1,1,2-trichloro-1,2,2-trifluoroethane.

The phosphoric acid esters suitable for use in preparing the gel compositions of the present invention are generally mixtures of mono- and di-esters and are preferably made by reacting 1 mol of $P_2O_5$ with from 2 to 4.5 mols of the ethylene oxide and/or propylene oxide adduct of the linear or branched chain aliphatic alcohols at a temperature up to about 100° C. in the presence of an inert organic liquid diluent, most advantageously in the range of about 50° C. to 65° C. The process by which these phosphate esters can be produced is well known and disclosed, for instance, in U.S. Pats. 2,441,295; 2,676,975; 2,701,258 and 3,004,056; Chemical Industries, October 1942, pp. 516–527, 557, and Organo Phosphorous Compounds, John Wiley & Sons, N.Y., 1950, pp. 220–223.

Illustrative alcohols from which the aforesaid ethylene oxide-adducts are made and which are reacted, for example with $P_2O_5$ to produce said phosphoric acid esters are n-octyl alcohol; n-nonyl alcohol; n-decyl alcohol, n-dodecyl alcohol, n-tridecyl alcohol, n-tetradecyl alcohol, n-pentadecyl alcohol, n-hexadecyl alcohol, oleyl alcohol, n-stearyl alcohol; Oxo alcohols containing from 10 to 20 carbon exemplified by Oxo tridecyl alcohol, Oxo hexadecyl alcohol, and Oxo pentadecyl alcohol (and others as shown in U.S. Pat. No. 2,965,678); 2-ethyl octanol, and branched chain dodecanols, tetradecanols, hexadecanols and octadecanols. Especially useful are the phosphoric acid esters of the 2 to 8 mol ethylene oxide adducts of $C_{10}$ to $C_{14}$ linear aliphatic alcohols (decyl, undecyl, dodecyl, tridecyl and tetradecyl alcohols) and mixtures of two or more of said alcohols.

In certain cases the ethylene oxide may be replaced by propylene oxide or in part by propylene oxide, generally up to about 25% by weight of the ethylene oxide being replaced by propylene oxide. It is particularly desirable, however, to use only ethylene oxide as the alkylene oxide in making the adducts.

In preparing the compositions of the present invention the phosphate ester is employed in the form of an alkanolamine neutralized salt. Triethanolamine is preferred for this purpose. Also suitable are mono- and diethanolamine, propanolamine, isopropanolamine, butanol- and pentanolamines, and other alkanolamines wherein the alkanol portion contains from about 2 to 9 carbon atoms.

The normally liquid aliphatic polyhydric alcohols which are utilized in the compositions of the present invention are those alcohols containing from 2 to 10 carbon atoms. Especially suitable and preferred is ethylene glycol. Other illustrative examples of such polyhydric alcohols are propylene glycol, tetraethylene glycol, pentaerythritol and glycerol.

Only very small proportions of gelling agent, generally in the area of about 5% by weight of the composition, are required to produce compositions of good long term stability. Thus, gels containing about 95% by weight hydrocarbon are generally readily formed. The relative proportions of components in the gelling agent should be in the area of, by weight, about 1 part water, 1 part polyhydric alcohol and 1 part alkanolamine neutralized phosphate ester and preferably about 1 part phosphate ester, 2 parts water and 2 parts polyhydric alcohol. These relative proportions may be varied within certain limits. While greater quantities of water and polyhydric alcohol over the quantity of phosphate ester may be used, if desired, for some specific application, the effect upon gelatinization and stability is generally not significant.

Although no more than about 5% by weight gelling agent is necessary to produce the hydrocarbon compositions of the present invention, greater proportions can be used, and gels containing up to about 60% and even more gelling agent and 40% or less hydrocarbon may be prepared if so desired.

It has been found especially advantageous to prepare the gels by a certain order of addition in order to achieve gelation rapidly. The technique which furnishes the best results is to add the hydrocarbon to a solution made up of the alkanolamine salt of the phosphate ester and about 25%–75%, preferably about half, of the water and polyhydric alcohol compounds of the gelling agent, and after these materials are mixed at room temperature the remaining water and polyhydric alcohol are added and the gel forms very rapidly.

The following examples are illustrative of the practice of this invention but are not to be considered as limitative of its scope. All percentages stated are by weight.

EXAMPLE I–IV

Kerosene gels were prepared utilizing the below listed materials. The procedure followed was to add kerosene to a solution consisting of the alkanolamine salt of the phosphate acid ester, water and ethylene glycol. About half the ethylene glycol and water were not added until after the kerosene. In each case gelation occurred as soon as all components had been intermixed.

| Example | Percent | | | |
|---|---|---|---|---|
| | I | II | III | IV |
| Component: | | | | |
| Ethylene glycol | 1.8 | 4.4 | 2.2 | 20.0 |
| Water | 2.2 | 5.2 | 2.6 | 24.0 |
| Phosphoric acid ester [1] | 1.1 | 2.6 | 1.3 | 12.0 |
| Triethanolamine | 0.4 | 0.9 | 0.45 | 4.0 |
| Kerosene | 94.5 | 86.9 | 93.45 | 40.0 |

[1] Phosphoric acid ester of a mixture (by weight) of approximately 80% $C^{10}$ and $C^{12}$ linear aliphatic primary alcohols containing 6 mols of ethylene oxide per mol of said alcohols.

EXAMPLE V

Following the procedure of Example I, a gel was prepared consisting of 3.3% ethylene glycol, 4% water, 2% phosphoric acid ester of Examples I–IV, 0.7% triethanolamine and 90% white oil having a viscosity of about 150 Saybolt Universal Seconds at 100° F.

EXAMPLE VI

Following the procedure of Example I, a gel was prepared consisting of 3.3% ethylene glycol, 4% water, 2% phosphoric acid ester of Examples I–IV, 0.7% triethanolamine and 90% petroleum ether.

What is claimed is:
1. A gelled hydrocarbon composition comprising a normally liquid water-immiscible aliphatic organic liquid and at least about 5% by weight of the composition, of a gelling agent consisting essentially of water, $C_2$ to $C_{10}$ polyhydric alcohol and phosphoric acid ester of at least one member selected from the group consisting of ethoxylated propoxylated $C_8$ to $C_{18}$ linear aliphatic alcohols and mixtures of said oxylated alcohol and $C_{10}$ to $C_{20}$ branched chain aliphatic alcohols and containing from 2 to 20 mols per mol of said alcohol of an alkylene oxides selected from the groups consisting of ethylene oxide, propylene oxide and mixtures thereof, said phosphoric acid ester being present as a $C_2$ to $C_9$ alkanolamine salt.

2. A composition according to claim 1 wherein the water, polyhydric alcohol and alkanolamine neutralized phosphate ester are present in the relative proportions, by weight, of about 1 to 1 to 1.

3. A composition according to claim 2 wherein the water-immiscible aliphatic organic liquid is an aliphatic hydrocarbon fraction boiling in the range of about 40° C. to 400° C.

4. A composition according to claim 3 wherein the hydrocarbon is kerosene.

5. A composition according to claim 3 wherein the polyhydric alcohol is ethylene glycol.

6. A composition according to claim 5 wherein the alkanolamine is at least one member of the group consisting of mono-, di- and triethanolamine.

7. A composition according to claim 6 wherein the phosphoric acid ester is that of a $C_8$ to $C_{14}$ linear aliphatic alcohol and mixtures thereof containing 2 to 8 mols of ethylene oxide per mol of said alcohol.

8. A composition according to claim 1 wherein the phosphoric acid ester is that of a 2 to 8 mol ethylene oxide adduct of a $C_8$ to $C_{18}$ linear aliphatic alcohol or a $C_{10}$ to $C_{20}$ branched chain aliphatic alcohol.

9. A process for producing gelled water-immiscible aliphatic organic liquid compositions which comprises a water-immiscible aliphatic organic liquid with at least about 5%, by weight of the composition, of the gelling agent of claim 1, said materials being combined by adding said water-immiscible aliphatic organic liquid to a mixture of the phosphoric acid ester and about 25%–75% by weight of the water and polyhydric alcohol, the remaining water and polyhydric alcohol being added after the water-immiscible aliphatic organic liquid.

10. The process of claim 9 wherein the water immiscible aliphatic organic liquid is a predominantely aliphatic hydrocarbon.

11. The process of claim 9 wherein the phosphoric acid ester is that of at least one member selected from the group consisting of $C_8$ to $C_{18}$ linear aliphatic alcohols and $C_{10}$ to $C_{20}$ branched chain aliphatic alcohols containing 2 to 8 mols of ethylene oxide per mol of said alcohol.

12. The process of claim 11 wherein the aliphatic polyhydric alcohol is ethylene glycol.

13. The process of claim 12 wherein the alkanolamine is at least one member selected from the group consisting of mono-, di- and triethanolamine.

References Cited

UNITED STATES PATENTS 3,114,710   12/1963   Calhoun _____ 44—7X
3,361,665   1/1968   Tesche et al. _____ 44—7

BENJAMIN R. PADGETT, Primary Examiner

U.S. Cl. X.R.

149—109

UNITED STATES PATENT OFFICE
CERTIFICATE OF CORRECTION

Patent No. 3,586,490  Dated June 22, 1971

Inventor(s) Gerhart Karg

It is certified that error appears in the above-identified patent and that said Letters Patent are hereby corrected as shown below:

In the heading to the printed specification, lines 3 and 4, "assignor to Witco Chemical Company, Inc." should read -- assignor to Witco Chemical Corporation --.

Signed and sealed this 12th day of September 1972.

(SEAL)
Attest:

EDWARD M.FLETCHER,JR.  ROBERT GOTTSCHALK
Attesting Officer  Commissioner of Patents